United States Patent
Roger et al.

(10) Patent No.: US 10,796,617 B2
(45) Date of Patent: Oct. 6, 2020

(54) DEVICE, METHOD AND SYSTEM FOR PROCESSING AN IMAGE DATA STREAM

(71) Applicant: Infineon Technologies AG, Neubiberg (DE)

(72) Inventors: Andre' Roger, Munich (DE); Romain Ygnace, Munich (DE)

(73) Assignee: Infineon Technologies AG, Neubiberg (DE)

( * ) Notice: Subject to any disclaimer, the term of this patent is extended or adjusted under 35 U.S.C. 154(b) by 891 days.

(21) Appl. No.: 13/916,446

(22) Filed: Jun. 12, 2013

(65) Prior Publication Data
US 2014/0368514 A1 Dec. 18, 2014

(51) Int. Cl.
*G06F 15/80* (2006.01)
*G09G 5/00* (2006.01)
*G09G 3/20* (2006.01)
*G06T 1/60* (2006.01)

(52) U.S. Cl.
CPC ............. *G09G 3/20* (2013.01); *G06F 15/80* (2013.01); *G06T 1/60* (2013.01); *G09G 5/005* (2013.01); *G09G 2340/02* (2013.01); *G09G 2340/0428* (2013.01); *G09G 2360/02* (2013.01); *G09G 2360/06* (2013.01)

(58) Field of Classification Search
CPC .................. G09G 2340/0428; G09G 2360/02
See application file for complete search history.

(56) References Cited

U.S. PATENT DOCUMENTS

| 6,097,435 A * | 8/2000 | Stanger et al. ........... 375/240.03 |
| 8,725,990 B1 * | 5/2014 | Karandikar et al. ............ 712/22 |
| 8,917,778 B2 | 12/2014 | Sakurai et al. |
| 2001/0040581 A1 * | 11/2001 | Reddy ........................... 345/541 |
| 2004/0141067 A1 * | 7/2004 | Nakayama ........... H04N 1/0411 348/222.1 |
| 2005/0190274 A1 | 9/2005 | Yoshikawa et al. |
| 2007/0055803 A1 * | 3/2007 | Fuchs et al. .................. 710/107 |
| 2009/0022403 A1 | 1/2009 | Takamori et al. |
| 2010/0232497 A1 * | 9/2010 | MacInnis et al. ....... 375/240.03 |
| 2010/0278271 A1 * | 11/2010 | MacInnis ................. 375/240.18 |
| 2012/0032960 A1 | 2/2012 | Kameyama |
| 2012/0257079 A1 * | 10/2012 | Ninan .................. H04N 5/2355 348/222.1 |
| 2012/0314948 A1 | 12/2012 | Raveendran et al. |
| 2013/0021504 A1 * | 1/2013 | Plowman ............... H04N 19/56 348/241 |

(Continued)

FOREIGN PATENT DOCUMENTS

| JP | 2003348542 A | 12/2003 |
| JP | 2004320502 A | 11/2004 |
| KR | 1020100004546 | 7/2011 |

*Primary Examiner* — Jacinta M Crawford
(74) *Attorney, Agent, or Firm* — Eschweiler & Potashnik, LLC

(57) ABSTRACT

An implementation relates to a device for processing an image data stream. The device may include a first processing unit and a second processing unit for receiving the image data stream. The first processing unit may be arranged for providing a first data stream, the first data stream has a reduced bandwidth compared to the image data stream. The second processing unit may arranged for providing a second data stream, the second data stream has a reduced bandwidth compared to the image data stream.

29 Claims, 4 Drawing Sheets

(56) References Cited

U.S. PATENT DOCUMENTS

2013/0088600 A1    4/2013  Wu et al.
2013/0265311 A1*  10/2013  Na ............................ G06T 3/40
                                                         345/428

\* cited by examiner

DEVICE, METHOD AND SYSTEM FOR PROCESSING AN IMAGE DATA STREAM

BACKGROUND OF THE INVENTION

Embodiments relate to an improvement of (pre-)processing of image data.

In order to enhance road safety and reduce accidents, Euro-NCAP defined that specific Advanced Driver Assistance System (ADAS) features and test scenarios to be used in cars produced from 2016 onward in order to obtain a five star rating.

Different types of systems are used that are, e.g., camera-based or radar-based, which are intended to detect risk situations, notify a driver and in case the driver does not intervene in time, autonomously initiate an action, e.g., slow down a car to avoid a collision.

Camera-based systems in particular enable forward collision warning, lane departure and high beam assist.

In order to provide a desired degree of safety even under varying and different light conditions, high dynamic sensors may be used, which in turn results in an increasing demand for memory and computing performance. On the other hand, camera-based systems are intended to become less expensive so that more cars can be equipped with such safety enhancing feature.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION OF THE PREFERRED EMBODIMENTS

Figure 1:
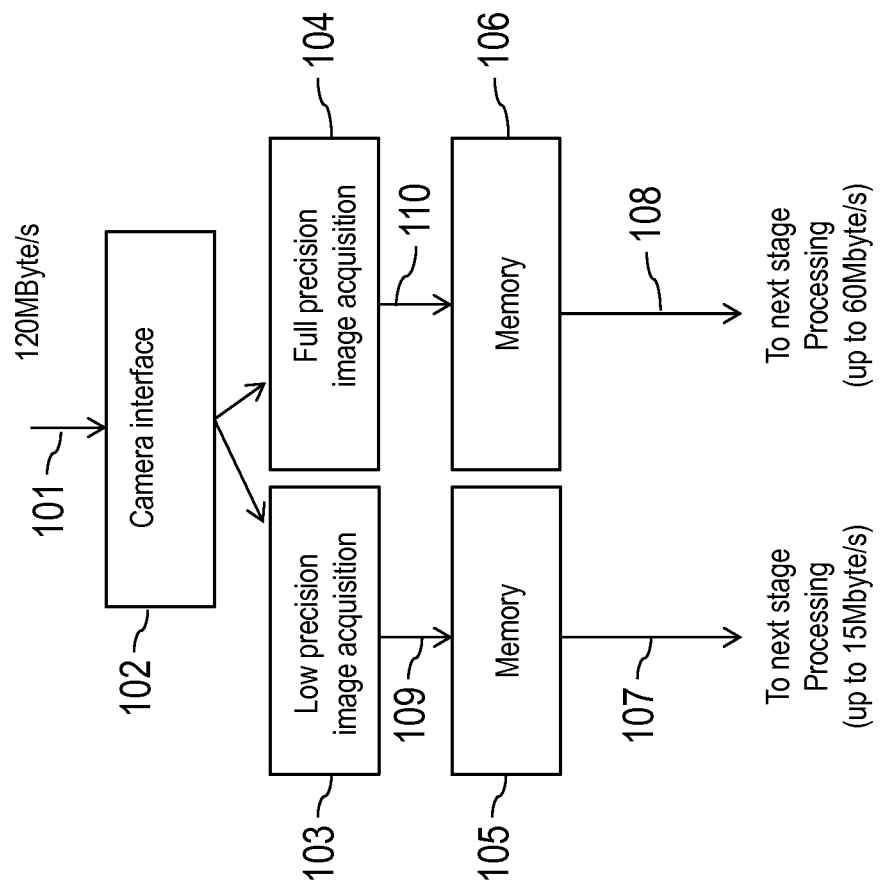
FIG. 1 shows an exemplary schematic as it may be utilized in an ADAS application.

The approach presented in particular provides an image preprocessor architecture with a low demand for memory. The solution can in particular be utilized in an Advanced Driver Assistance System (ADAS).

Image processing for ADAS may use several processing paths, wherein at least two of the processing paths may be arranged in parallel to each other. Image memory may comprise random access memory (RAM), which is regarded a key factor for the costs of ADAS devices.

A first embodiment relates to a device for processing an image data stream, comprising a first processing unit and a second processing unit for receiving the image data stream; wherein the first processing unit is arranged for providing a first data stream, wherein the first data stream has a reduced bandwidth compared to the image data stream; and wherein the second processing unit is arranged for providing a second data stream, wherein the second data stream has a reduced bandwidth compared to the image data stream.

An image data stream may be any data provided by an image recording device, e.g., a camera. The image data stream comprises images or pictures taken at a particular rate. A data rate of the image data streams depends on the size of the images taken and the amount of the, i.e. how often the images are recorded per time interval. The image data stream may be provided by at least one camera. The image data stream may have been pre-processed by a camera interface, wherein such pre-processing may in particular comprise de-compression.

The first processing unit and the second processing unit may be physically separate processing entities that may in particular deployed on a single chip or on several chips. Each processing unit builds a processing path also referred to as pixelpath. There may be two or more processing units processing the image data stream.

The compression rate of the first processing unit and the compression rate of the second processing unit may be adjusted or subject to configuration.

A second embodiment relates to a device comprising a first processing unit coupled to an input image data stream, wherein the first processing unit is arranged for providing a first data stream, wherein the first data stream has a reduced bandwidth compared to the input image data stream; comprising a second processing unit coupled to the input image data stream, wherein the second processing unit is arranged for providing a second data stream, wherein the second data stream has a reduced bandwidth compared to the image data stream; and comprising a memory for at least partially storing the first data stream and the second data stream.

A third embodiment relates to a method for processing an image data stream comprising the following steps:
  providing a first data stream, wherein the first data stream has a reduced bandwidth compared to the image data stream;
  providing a second data stream, wherein the second data stream has a reduced bandwidth compared to the image data stream;
  wherein the first data stream is provided by a first processing unit and the second data stream is provided by a second processing unit.

A forth embodiment is directed to a system for processing an image data stream comprising: means for providing a first data stream, wherein the first data stream has a reduced bandwidth compared to the image data stream; and means for providing a second data stream, wherein the second data stream has a reduced bandwidth compared to the image data stream.

FIG. 1 shows an exemplary schematic as it may be utilized in an ADAS application. A video stream 101 (also referred to as image stream or (image) data stream) with a data rate amounting to 120 MByte/s is fed to a camera interface 102, which may decompress this video stream 101 and feed the decompressed stream to a low precision image acquisition unit 103 and to a full precision image acquisition unit 104.

The low precision image acquisition unit 103 processes the input stream and provides a stream 109 comprising the full scenery (i.e. 100% of the image) at a reduced resolution. The stream 109 is stored in a memory 105. A next stage may utilize the data of this stream 109 stored in the memory 105 via a stream 107 at a data rate amounting to, e.g., up to 15 MByte/s.

The full precision image acquisition unit 104 processes the input stream and provides a stream 110 comprising a reduced scenery (e.g., 30% or 50% of the scenery of the image contained in the stream 101) at its full resolution. The stream 110 is stored in a memory 106. A next stage may utilize the data of this stream 110 stored in the memory 106 via a stream 108 at a data rate amounting to, e.g., up to 60 MByte/s.

Hence, the example shown in FIG. 1 can be used in a single chip ADAS device comprising two acquisition paths: one of low resolution covering the whole image or scenery of the input stream 101 and another of high resolution covering a portion of the whole image or scenery of the input stream 101.

It is noted that the single chip can be a single substrate, die, wafer or silicon.

The approach presented herein in particular allows reducing the load of a processor (e.g., CPU or signaling processor) during an image pre-processing utilizing a reduced amount of memory (in particular RAM). This may be useful for camera-based ADAS applications. The solution is in particular beneficial as upcoming generations of cameras have even higher resolution sensors thus providing image streams at an even increased data rate.

Hence, the solution presented in particular addresses increasing RAM requirements in ADAS applications. Pursuant to the approach presented, the amount of memory required can be significantly reduced (considering the same data rate of video streams). In case of video streams with increasing data rates, the additional amount of memory required can be reduced. It is noted that reducing the amount of RAM required also implies that an area on the silicon for a single chip solution can be reduced and may either result in a smaller single chip or in a single chip of the same size with an increased performance. Both effects are beneficial and cost-efficient.

Figure 2:
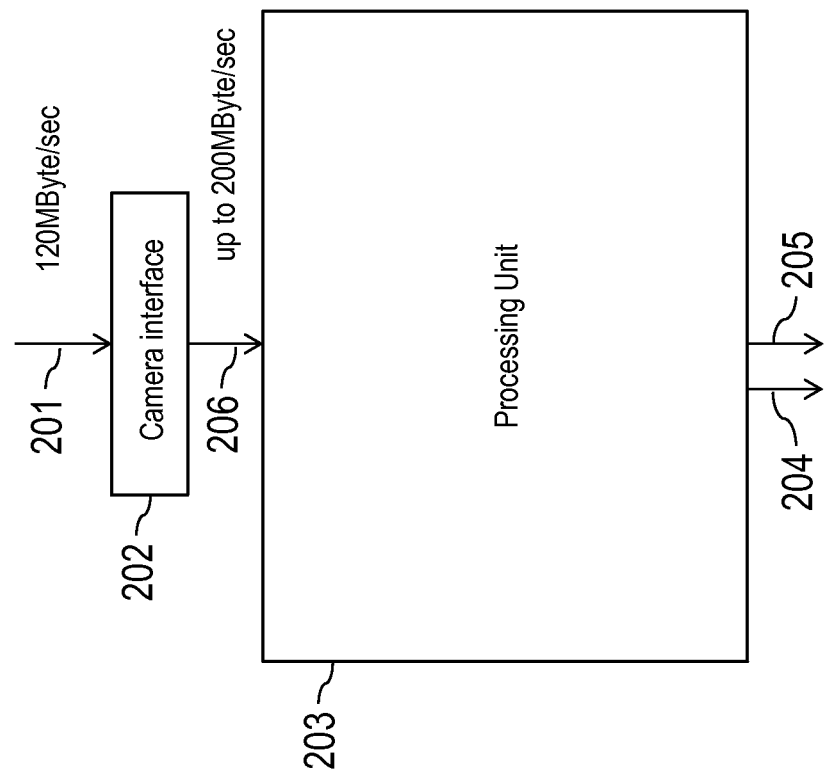
FIG. 2 shows an exemplary schematic of an image processing architecture.

FIG. 2 shows an exemplary schematic of an image processing architecture. A (e.g., compressed) data stream 201 at a data rate of 120 MByte/s is fed to a camera interface 202, which decompresses the data stream 201 and supplies a (decompressed) data stream 206 at a data rate up to 200 MByte/s to a processing unit 203. It is noted that the data stream 201 may be a compressed or a non-compressed data stream.

The processing unit 203 may provide at least one of the following:
- at least two compressed data streams utilizing different compression rates,
- at least one of the compressed data streams is of high resolution;
- at least one of the compressed data streams is of reduced (e.g., low) resolution;
- at least one of the compressed data streams comprises the full image or scenery of the data stream 206;
- at least one of the compressed data streams comprises a portion of the image or scenery of the data stream 206;
- at least one filtered compressed data stream.

The portion of the image or scenery may refer, e.g., to a part of an image that is above or below the horizon. This may in particular be useful for pictures or videos taken of a road ahead, because the road may often be found in an area below the horizon. Extraction mechanisms and imaging processing algorithms could be used to determine said portion of the image or scenery.

Resolution in this regard may refer to the number of bits used per pixel (also referred to as pixel precision) and/or to the number of pixel used for the image (of a video): For example, a video stream having a resolution of 1280×720 pixels with each pixel having 16 bit may be reduced to, e.g., 1024×576 pixels with each pixel having 16 bit, i.e. a smaller amount of pixels and/or 1280×720 pixels with each pixel having 8 bit, i.e. a smaller amount of pixel precision.

Of course, the figures above are merely examples; other resolutions as well as aspect ratios can be used accordingly. Also, the reduction of the amount of pixels and the reduction of the pixel precision can be combined, depending on a particular use case scenario.

As a result, the processing unit 203 supplies several data streams 204, 205 for further processing. The combined data rate (amounting to, e.g., 20 MByte/s to 30 MByte/s) of the data streams 204, 205 may be significantly reduced compared to the data rate of the stream 206. Each of the data streams 204, 205 may preferably formed of a given type of compressed video according to the possibilities of the processing unit 203.

For example, high precision algorithms based on high precision video can be used so that the output provided by the processing unit 203 can be substantially reduced compared to the data rate of its input (i.e. the data stream 206).

Hence, the solution may in particular provide hardware that can be used for image processing in ADASs with multiple data flows and high data compression each. Also, high precision processing can be used for an improved data reduction.

Such hardware may be organized as physically separated pixelpaths, wherein each pixelpath enables preprocessing of video data. Based on such hardware architecture, subsequent processing stages may cope with a reduced amount of memory (e.g., embedded RAM).

Figure 3:
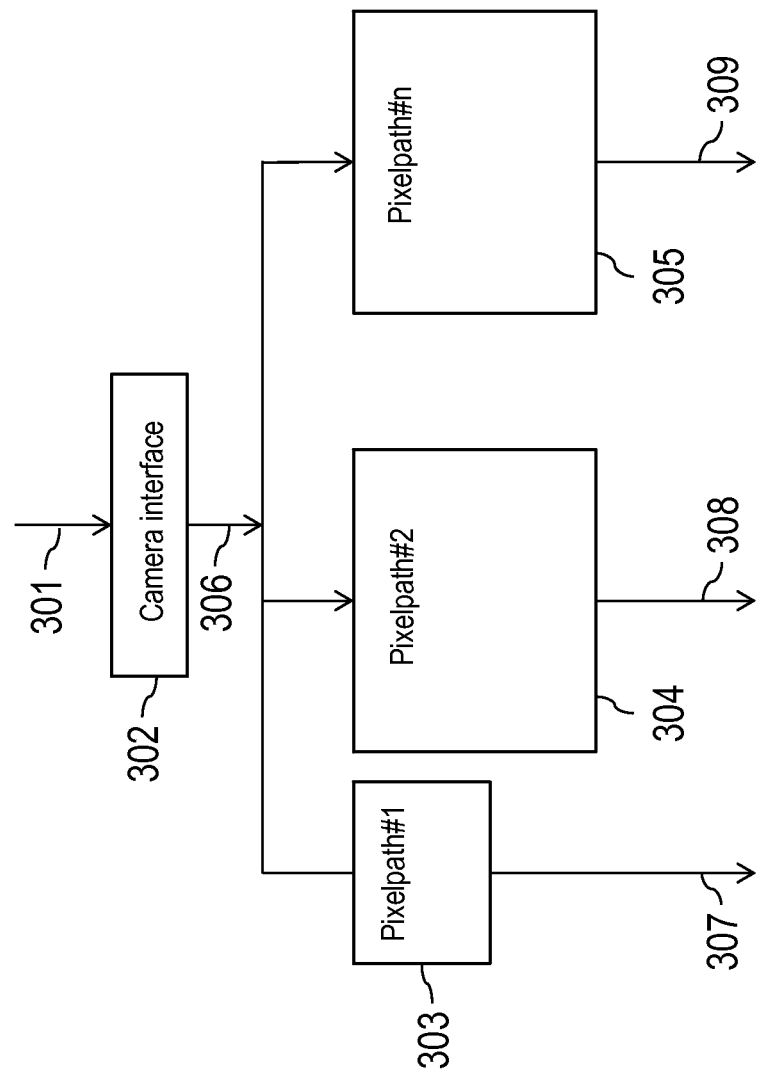
FIG. 3 shows an exemplary architecture comprising several pixelpaths that are arranged in parallel.

FIG. 3 shows an exemplary architecture comprising several pixelpaths that are arranged in parallel. A compressed data stream 301 is fed to a camera interface 302, which decompresses the data stream 301 and supplies a (decompressed) data stream 306 (full resolution, high precision pixel) to processing units 303 to 305, wherein each of the processing units 303 to 305 is part of one pixelpath.

The processing units 303 to 305 are arranged for processing images, in particular by using hardware accelerators in a way that allows reducing RAM requirements in subsequent processing stages.

Each of the processing units 303 to 305 may be arranged to provide at least one of the following:
- provide a data stream at a particular compression rate, wherein the compression rates among the processing units 303 to 305 may at least partially be identical or they may be at least partially different;
- a compressed data stream of high resolution;
- a compressed data stream of reduced (e.g., low) resolution;
- a compressed data stream comprising the full image or scenery of the data stream 306;
- a compressed data stream comprising a portion (e.g., detail) of the image or scenery of the data stream 306;
- a filtering operation.

Hence, each of the processing units 303 to 305 provides a data stream 307 to 309 for further processing. Because of their compression, the data streams 307 to 309 may together have a significantly lower data rate as the data stream 306. The data streams 307 to 309 may in particular be of different resolution (number of pixels and/or pixel resolution) and/or comprise different portions (details) of the input data stream 306. In addition, each of the data streams 307 to 309 may be subject to at least one filtering operation, e.g., in order to determine an infrared content in the image or in the portion of the image. These possibilities can be combined in order to supply appropriate data streams 307 to 309 that could utilize a memory in an efficient manner and allow subsequent processing stages to utilize the information obtained from the data stream 306 in a time and memory efficient way.

The solution presented can be implemented in or be part of an ADAS-related image processor. This image processor may be able to significantly reduce the output data rate and size so that computing requirements and memory requirements are optimized without or with limited compromise regarding output quality and precision of information passed to a general purpose image processor (e.g. the controller 402 of FIG. 4, see below). The image processor is able to provide several representations of a scene acquired by at least one sensor so that the memory required to store such representations can be significantly reduced.

Each of the processing units 303 to 305 can be part of such image processor providing data for the general purpose image processor. Multiple representations of a scenery based on the data stream 306 may be generated by the processing units 303 to 305. Each of the processing units 303 to 305 may use ADAS algorithms run by the general purpose image processor. An acquisition rate of each representation may optionally be subject to configuration.

The data streams 307 to 309 may be stored in a common shared memory. As an option, each of the data streams 307 to 309 may be stored in different portions of a (shared) memory.

It is another option that at least one data stream 307, 308 or 309 has an output rate that is different from at least one other data stream. In addition, a data stream 307, 308 or 309 may have multiple output rates, i.e., it may provide a compressed image at several moments in time, e.g., every n-th and every m-th clock cycle. In other words, the compressed image may be determined and/or stored once per time interval or several times within such time interval.

A algorithm utilized by at least one of the processing units 303 to 305 may comprise at least one of the following:
  a compression of the incoming data stream;
  region extraction;
  lossless down-sampling;
  filtering, in particular convolution filtering; and
  pixel size reduction.

These algorithms are merely examples, the algorithms may be subject to configuration, e.g., by a user or in an automated manner. Accordingly, other algorithms for image processing and/or filtering can be utilized. For example, known image compression algorithms like MPEG or H.26x could be utilized by at least one of the processing units 303 to 305.

According to an example, the processing unit 303 may generate a compressed image representing the entire scenery as supplied by the data stream 306, but with a reduced number of pixels and with a pixel precision of 16 bits per pixel to extract a position of a horizon in the data stream 306 and to analyze an image brightness. The processing unit 304 may generate a compressed image based using a blur filter (based on the entire scenery with a reduced amount of pixels and a reduced pixel precision). The processing unit 305 may generate a compressed image based on the use of configurable convolution filter(s) for edge detection (e.g., for lane detection and/or collision warning purposes). The processing units 303 to 305 generate these images at same or at different time intervals resulting in data streams 307 to 309 with same or different data rates (also depending on the size of each image of the respective data stream 307 to 309).

Figure 4:
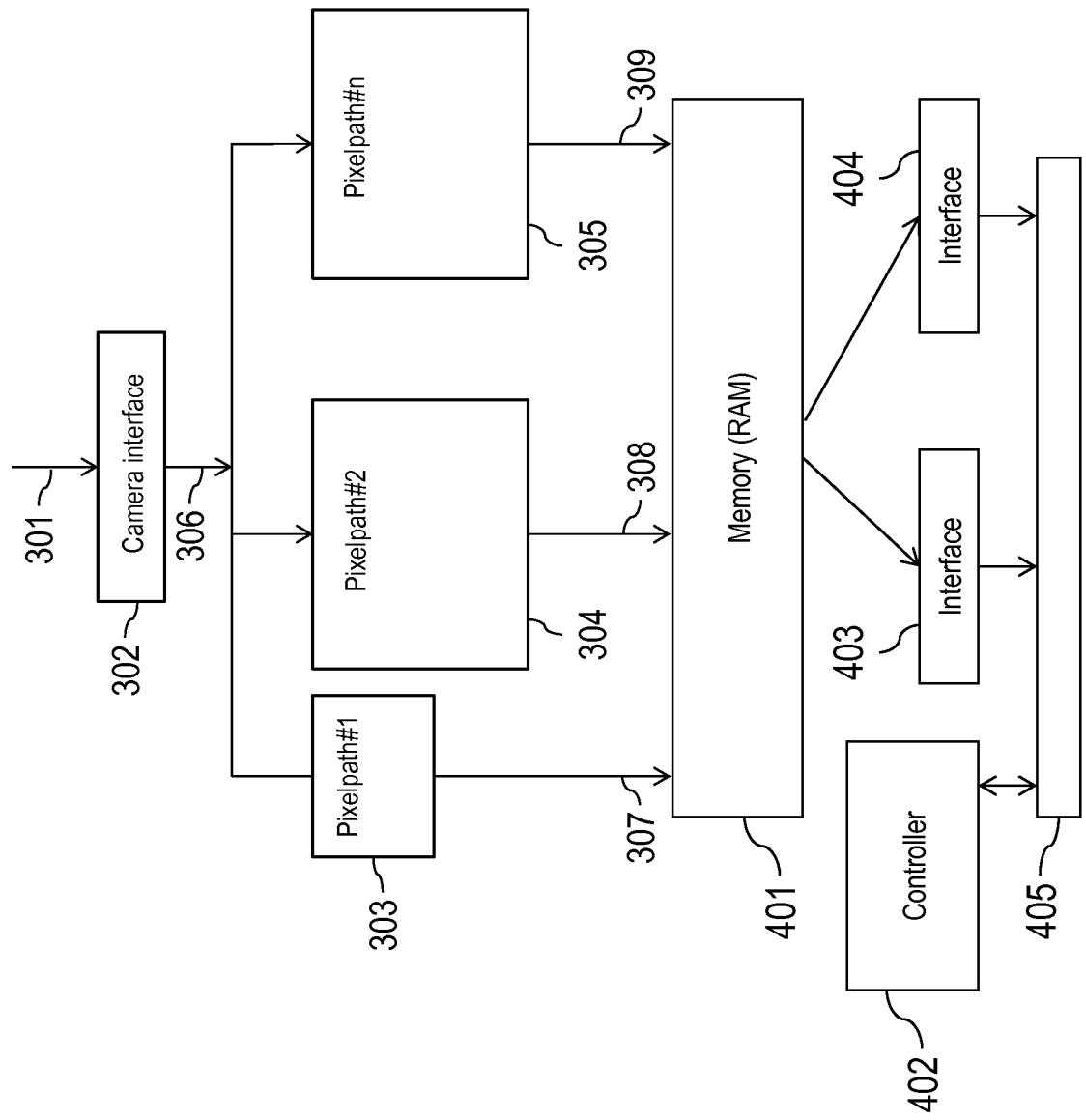
FIG. 4 shows an exemplary architecture comprising the pixelpaths of FIG. 3, wherein the data streams are stored in a memory, in particular realized as an embedded RAM.

The solution suggested allows for easy software partitioning between generic image compression focused on pre-processing and image post-processing by the general purpose processor (next stage processing, see, e.g., controller 402 in FIG. 4).

It is an option that processing, in particular by hardware accelerators, can be done line-based or image-based. For example, line-based processing can be used to reduce the memory required for buffering.

It is another option that each of the processing units 303 to 305 (or at least some of them) comprises a lossless down-sampling stage.

It is a further option that the at least one of the processing units 303 to 305 may provide an output at different image rates also having a significant impact on the data rate of each of the data streams 307 to 309. For example, the processing units 304 and 305 may process the data stream 306 and provide an output at a certain clock rate, i.e. after time-intervals of a length t. The processing unit 303 may conduct a different operation, which may, e.g., be complex or required less often, and it may provide the result of its processing at a different clock rate, e.g., at a time interval amounting to 2t, in this example every second time interval t compared to the results provided by the processing units 304 and 305. Hence, based on the processing capability of each processing unit 303 to 305 and/or the use case scenario, the workload of processing the data stream 306 towards various objectives can be efficiently distributed among the pixelpaths, i.e. the processing units 303 to 305.

It may also be an option to enable processing of at least one of the processing units 303 to 305 by an external signal and/or configuration flag so that the external signal and/or configuration flag may define which processing unit(s) will preprocess the acquired image when a subsequent image is acquired. For example, a change in the light condition determined by a sensor can be used to start or re-start at least one of the processing units 303 to 305.

Beneficially, the examples presented use pixelpaths to provide efficient pre-processing according to use case requirements. The data rate of the input data stream 306 is substantially reduced by the combination of the data streams 307 to 309 supplied by the processing units 303 to 305. Hence, the amount of memory (e.g., surface on a chip used for RAM) can be significantly reduced or—as an alternative—higher data rates (e.g., more pixelpaths) can be processed, which results in either cheaper products or products of higher performance utilizing the same chip area. This is in particular useful for single-chip solutions utilizing embedded RAM.

Example: Conversion Via Interface

FIG. 4 shows an exemplary architecture comprising the pixelpaths of FIG. 3, wherein the data streams 307 to 309 are stored in a memory 401 (in particular an embedded RAM).

An interface 403 and/or an interface 404 are provided to obtain information of the data streams 307 to 309 from the memory 401 and to convert it in a format that is suitable and/or efficient for a controller 402 to process. The controller 402 and the interfaces 403, 404 are coupled via a bus 405. The controller 402 may be or it may comprise a central processing unit, a signal processor, a microcontroller or the like.

For example, the data streams 307 to 309 stored in the memory 401 may have a pixel precision amounting to 8 bits, but the controller 402 may operate efficiently on 16 bits rather than 8 bits. Hence, the interfaces 403 and 404 (respectively or in combination) may provide a conversion from 8 bits to 16 bits for the controller 402 being able to process the data streams 307 to 309 (or portions thereof) in an efficient manner.

The approach of conversion has the advantage that the memory 401 can still be used efficiently, because 8 bit image data is transformed to 16 bit image data by the interfaces 403, 404 and no such 16 bit image data need to be stored in the memory 401.

Hence, the interfaces 403 and 404 can be designed such that pixel information can be stored per minimum required precision and it may be transformed to a format suitable for the controller 402.

It is noted that at least one such interface can be provided for conversion purposes. Also, several interfaces 403 and 404 can be used. As an option, the interface 403 is arranged to read pixels in the format stored in memory 401 and passes these pixels to the controller 402 without any conversion. It is also an option that the interface 404 is arranged to read pixels stored in the memory 401, converts them in the format suitable for the controller 402 and forwards the converted pixels to the controller 402.

The conversion may comprise an up conversion, e.g., from 8 bits to 16 bits or from 4 bits to 16 bits. The conversion may also comprise a down-conversion, e.g., from 32 bits to 16 bits or the like.

Further Advantages and Examples

The solution presented enables a beneficial hardware configuration to cover, e.g., camera-based ADAS with reduces RAM requirements. For example, a sensor comprising 1280×720 pixels may require 1.8 MByte RAM buffer. By reducing the data rate of the data stream, the RAM required may be reduced to 690 KByte, which saves more than 1.1 MByte of RAM. This corresponds to an area of 4 square millimeter silicon area in 40 nm and results in a reduction to ⅓.

Using hardware accelerators beneficially allows for high energy efficiency, which may also increase the life period of attached components like, e.g., (signal) processors.

The solution presented further enables using the same silicon to cover radar and image processing as 1 MByte of RAM may suffice for processing radar and image data.

The solution presented may be applicable in the field of personal transportation or in industrial applications. It is in particular useful when implemented in moving entities, e.g., vehicles of any kind, in particular where it is of interest to detect and/or monitor their surroundings and/or determine particularities of their surroundings.

The architecture suggested could be used in combination with an ADAS preprocessor allowing a significant memory reduction. This can in particular be beneficial with regard to at least one of the following applications: high beam assist, lane departure warning, forward collision warning.

The approach can also be utilized for optimizing or reducing power consumption, because of its low memory requirements.

At least one of the following examples and/or embodiments may be considered innovative. They might be combined with other aspects or embodiments as described. Any embodiment or design described herein is not necessarily to be construed as preferred or advantageous over other embodiments or designs.

A device for processing an image data stream is suggested,
comprising a first processing unit and a second processing unit for receiving the image data stream;
wherein the first processing unit is arranged for providing a first data stream, wherein the first data stream has a reduced bandwidth compared to the image data stream;
wherein the second processing unit is arranged for providing a second data stream, wherein the second data stream has a reduced bandwidth compared to the image data stream.

In an embodiment, the first processing unit is arranged to provide at least one of the following:
generate the first data stream from the image data stream at a first compression rate;
generate the first data stream from the image data stream with a first resolution;
generate the first data stream from the image data stream based on a portion of the scenery of the image data stream;
generate the first data stream from the image data stream based on a filtering operation.

In an embodiment, the first compression rate results in a lossless compression or in a lossy compression of the image data stream.

In an embodiment, the first resolution comprises at least one of the following:
a reduced amount of pixels compared to the images of the image data stream;
a reduced amount of pixel precision compared to the images of the image data stream;
a reduced amount of images per time compared to the images per time of the image data stream.

In an embodiment, the second processing unit is arranged to provide at least one of the following:
generate the second data stream from the image data stream at a second compression rate;
generate the second data stream from the image data stream with a second resolution;
generate the second data stream from the image data stream based on a portion of the scenery of the image data stream;
generate the second data stream from the image data stream based on a filtering operation.

In an embodiment, the second compression rate results in a lossless compression or in a lossy compression of the image data stream.

In an embodiment, the second resolution comprises at least one of the following:
a reduced amount of pixels compared to the images of the image data stream;
a reduced amount of pixel precision compared to the images of the image data stream;
a reduced amount of images per time compared to the images per time of the image data stream.

In an embodiment, the portion of the scenery of the image data stream is determined via image processing, in particular region extraction.

In an embodiment, the filtering operation comprises at least one of the following:
a low-pass filtering;
a high-pass filtering;
a blur filtering;
a convolution filtering.

In an embodiment, the first data stream is determined based on the image data stream by processing images of the image data stream line by line.

In an embodiment, the second data stream is determined based on the image data stream by processing images of the image data stream line by line.

In an embodiment, an acquisition rate of the first processing unit and an acquisition rate of the second processing unit is each configurable.

In an embodiment, the first data stream has a different number of images per time interval compared to the image data stream.

In an embodiment, the second data stream has a different number of images per time interval compared to the image data stream.

In an embodiment, the device comprises a memory for at least partially storing the first data stream and the second data stream.

In an embodiment, that said memory is a shared memory, wherein the first processing unit is associated with a first portion of the shared memory and the second processing unit is associated with a second portion of the shared memory.

In an embodiment, said memory comprises a random access memory.

In an embodiment, the first processing unit, the second processing unit and the random access memory are arranged on a single chip.

In an embodiment, the device comprises at least one interface that is arranged for accessing the memory and for converting data of the first data stream and of the second data stream into a predefined format.

In an embodiment, the predefined format comprises a number of bits used by a controller that is arranged for processing images from the first data stream and the second data stream.

A device is suggested
  comprising a first processing unit coupled to an input image data stream, wherein the first processing unit is arranged for providing a first data stream, wherein the first data stream has a reduced bandwidth compared to the input image data stream;
  comprising a second processing unit coupled to the input image data stream, wherein the second processing unit is arranged for providing a second data stream, wherein the second data stream has a reduced bandwidth compared to the image data stream;
  comprising a memory for at least partially storing the first data stream and the second data stream.

In an embodiment, the components of the image pre-processing stage are arranged on a single chip and wherein the memory is a random access memory arranged on the single chip.

A method is suggested for processing an image data stream comprising the following steps:
  providing a first data stream, wherein the first data stream has a reduced bandwidth compared to the image data stream;
  providing a second data stream, wherein the second data stream has a reduced bandwidth compared to the image data stream;
  wherein the first data stream is provided by a first processing unit and the second data stream is provided by a second processing unit.

In an embodiment, the method comprising the step:
  at least partially storing the first data stream and the second data stream in a memory.

In an embodiment, the step of providing the first data stream comprises at least one of the following:
  generating the first data stream from the image data stream at a first compression rate;
  generating the first data stream from the image data stream with a first resolution;
  generating the first data stream from the image data stream based on a portion of the scenery of the image data stream;
  generating the first data stream from the image data stream based on a filtering operation.

In an embodiment, the first resolution comprises at least one of the following:
  a reduced amount of pixels compared to the images of the image data stream;
  a reduced amount of pixel precision compared to the images of the image data stream;
  a reduced amount of images per time compared to the images per time of the image data stream.

In an embodiment, the step of providing the second data stream comprises at least one of the following:
  generating the second data stream from the image data stream at a second compression rate;
  generating the second data stream from the image data stream with a second resolution;
  generating the second data stream from the image data stream based on a portion of the scenery of the image data stream;
  generating the second data stream from the image data stream based on a filtering operation.

In an embodiment, the second resolution comprises at least one of the following:
  a reduced amount of pixels compared to the images of the image data stream;
  a reduced amount of pixel precision compared to the images of the image data stream;
  a reduced amount of images per time compared to the images per time of the image data stream.

A system is provided for processing an image data stream comprising:
  means for providing a first data stream, wherein the first data stream has a reduced bandwidth compared to the image data stream;
  means for providing a second data stream, wherein the second data stream has a reduced bandwidth compared to the image data stream.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

What is claimed is:

1. A device for processing an image data stream, comprising:
  a first processing unit and a second processing unit for receiving the image data stream;
  wherein the first processing unit is arranged for providing a first data stream, wherein the first data stream has a reduced bandwidth compared to the image data stream, the first data stream including a full or partial representation of a scene associated with the image data stream, the full or partial representation of the scene having a reduced resolution with respect to the image data stream;

wherein the second processing unit is arranged for providing a second data stream, wherein the second data stream has a reduced bandwidth compared to the image data stream, the second data stream including a partial representation of the scene associated with the image data stream, the partial representation of the scene having a full resolution or a reduced resolution with respect to the image data stream.

2. The device according to claim 1, wherein the first processing unit is arranged to provide at least one of the following:
- generate the first data stream from the image data stream at a first compression rate;
- generate the first data stream from the image data stream with a first resolution;
- generate the first data stream from the image data stream based on a portion of the scenery of the image data stream;
- generate the first data stream from the image data stream based on a filtering operation.

3. The device according to claim 2, wherein the first compression rate results in a lossless compression or in a lossy compression of the image data stream.

4. The device according to claim 2, wherein the first resolution comprises at least one of the following:
- a reduced amount of pixels compared to the images of the image data stream;
- a reduced amount of pixel precision compared to the images of the image data stream;
- a reduced amount of images per time compared to the images per time of the image data stream.

5. The device according to claim 2, wherein the filtering operation comprises at least one of the following:
- a low-pass filtering;
- a high-pass filtering;
- a blur filtering;
- a convolution filtering.

6. The device according to claim 1, wherein the second processing unit is arranged to provide at least one of the following:
- generate the second data stream from the image data stream at a second compression rate;
- generate the second data stream from the image data stream with a second resolution;
- generate the second data stream from the image data stream based on a portion of the scenery of the image data stream;
- generate the second data stream from the image data stream based on a filtering operation.

7. The device according to claim 6, wherein the second compression rate results in a lossless compression or in a lossy compression of the image data stream.

8. The device according to claim 6, wherein the second resolution comprises at least one of the following:
- a reduced amount of pixels compared to the images of the image data stream;
- a reduced amount of pixel precision compared to the images of the image data stream;
- a reduced amount of images per time compared to the images per time of the image data stream.

9. The device according to claim 6, wherein the filtering operation comprises at least one of the following:
- a low-pass filtering;
- a high-pass filtering;
- a blur filtering;
- a convolution filtering.

10. The device according to claim 1, wherein the first data stream is determined based on the image data stream by processing images of the image data stream line by line.

11. The device according to claim 1, wherein the second data stream is determined based on the image data stream by processing images of the image data stream line by line.

12. The device according to claim 1, wherein an acquisition rate of the first processing unit and an acquisition rate of the second processing unit is each configurable.

13. The device according to claim 1, wherein the first data stream has a different number of images per time interval compared to the image data stream.

14. The device according to claim 1, wherein the second data stream has a different number of images per time interval compared to the image data stream.

15. The device according to claim 1, comprising a memory for at least partially storing the first data stream and the second data stream.

16. The device according to claim 15, wherein said memory is a shared memory, wherein the first processing unit is associated with a first portion of the shared memory and the second processing unit is associated with a second portion of the shared memory.

17. The device according to claim 15, wherein said memory comprises a random access memory.

18. The device according to claim 17, wherein the first processing unit, the second processing unit and the random access memory are arranged on a single chip.

19. The device according to claim 15, comprising at least one interface that is arranged for accessing the memory and for converting data of the first data stream and of the second data stream into a predefined format.

20. The device according to claim 19, wherein the predefined format comprises a number of bits used by a controller that is arranged for processing images from the first data stream and the second data stream.

21. A device, comprising:
- a first processing unit coupled to an input image data stream, wherein the first processing unit is arranged for providing a first data stream, wherein the first data stream has a reduced bandwidth compared to the input image data stream, the first data stream including a full or partial representation of a scene associated with the input image data stream, the full or partial representation of the scene having a reduced resolution with respect to the image data stream;
- a second processing unit coupled to the input image data stream, wherein the second processing unit is arranged for providing a second data stream, wherein the second data stream has a reduced bandwidth compared to the image data stream I the second data stream including a partial representation of the scene associated with the input image data stream, the partial representation of the scene having a full resolution or a reduced resolution with respect to the image data stream;
- a memory for at least partially storing the first data stream and the second data stream.

22. The device according to claim 21, wherein the processing units are arranged on a single chip and wherein the memory is a random access memory arranged on the single chip.

23. A method for processing an image data stream, comprising:
providing a first data stream, wherein the first data stream has a reduced bandwidth compared to the image data stream, the first data stream including a full or partial representation of a scene associated with the image data stream, the full or partial representation of the scene having a reduced resolution with respect to the image data stream;

providing a second data stream, wherein the second data stream has a reduced bandwidth compared to the image data stream, the second data stream including a partial representation of the scene associated with the image data stream, the partial representation of the scene having a full resolution or a reduced resolution with respect to the image data stream;

wherein the first data stream is provided by a first processing unit and the second data stream is provided by a second processing unit.

24. The method according to claim 23, further comprising:
at least partially storing the first data stream and the second data stream in a memory.

25. The method according to claim 23, wherein providing the first data stream comprises at least one of the following:
generating the first data stream from the image data stream at a first compression rate;
generating the first data stream from the image data stream with a first resolution;
generating the first data stream from the image data stream based on a portion of the scenery of the image data stream;
generating the first data stream from the image data stream based on a filtering operation.

26. The method according to claim 25, wherein the first resolution comprises at least one of the following:
a reduced amount of pixels compared to the images of the image data stream;
a reduced amount of pixel precision compared to the images of the image data stream;
a reduced amount of images per time compared to the images per time of the image data stream.

27. The method according to claim 23, wherein providing the second data stream comprises at least one of the following:
generating the second data stream from the image data stream at a second compression rate;
generating the second data stream from the image data stream with a second resolution;
generating the second data stream from the image data stream based on a portion of the scenery of the image data stream;
generating the second data stream from the image data stream based on a filtering operation.

28. The method according to claim 27, wherein the second resolution comprises at least one of the following:
a reduced amount of pixels compared to the images of the image data stream;
a reduced amount of pixel precision compared to the images of the image data stream;
a reduced amount of images per time compared to the images per time of the image data stream.

29. A system for processing an image data stream, comprising:
means for providing a first data stream, wherein the first data stream has a reduced bandwidth compared to the image data stream, the first data stream including a full or partial representation of a scene associated with the image data stream, the full or partial representation of the scene having a reduced resolution with respect to the image data stream;
means for providing a second data stream, wherein the second data stream has a reduced bandwidth compared to the image data stream, the second data stream including a partial representation of the scene associated with the image data stream, the partial representation of the scene having a full resolution or a reduced resolution with respect to the image data stream.

* * * * *